United States Patent
Kruse et al.

(10) Patent No.: US 7,155,799 B2
(45) Date of Patent: Jan. 2, 2007

(54) METHOD OF HOLDING A KEY IN A KEYWAY

(75) Inventors: Robert C. Kruse, Churchville, NY (US); David J. Revelle, Rochester, NY (US)

(73) Assignee: Davenport Machine, Inc., Rochester, NY (US)

( * ) Notice: Subject to any disclaimer, the term of this patent is extended or adjusted under 35 U.S.C. 154(b) by 253 days.

(21) Appl. No.: 10/933,154

(22) Filed: Sep. 2, 2004

(65) Prior Publication Data

US 2006/0045610 A1   Mar. 2, 2006

(51) Int. Cl.
   *B21D 39/00* (2006.01)
   *B25G 3/28* (2006.01)
(52) U.S. Cl. .......................................... 29/515; 29/505
(58) Field of Classification Search ............... 29/515, 29/505, 428; 403/282, 359.6
   See application file for complete search history.

(56) References Cited

U.S. PATENT DOCUMENTS 6,905,280 B1 *   6/2005   Brunner et al. ............. 403/358

* cited by examiner

*Primary Examiner*—John C. Hong
(74) *Attorney, Agent, or Firm*—Phillips Lytle LLP

(57) ABSTRACT

An improved method of holding a key (20) in a keyway (31) includes the steps of: forming an elongated keyway in the member, the member having at least one sharp corner (34) facing into the keyway adjacent either end thereof; forming a key (20) to fit in the keyway, the key being so dimensioned, proportioned and configured that the part of the key immediately adjacent each sharp corner will be recessed with respect to the surface of the member at the corner; placing the key in the keyway; and plastically deforming portions (40) of the member at the sharp corners into the keyway so as to permanently hold the key in the keyway.

12 Claims, 2 Drawing Sheets

METHOD OF HOLDING A KEY IN A KEYWAY

TECHNICAL FIELD

The present invention relates generally to the field of keys-keyways, and, more particularly, to an improved keyway, and to an improved method of holding a key in a keyway.

BACKGROUND ART

Keys and keyways are commonly used to rotationally drive one part from another. In many forms, at least one of the parts is provided with an elongated slot. A key has a portion placed in the slot. Another portion of the key extends beyond the slot, and is arranged to be received in a complimentarily-configured slot in another member. Thus, the key operatively and rotatably drive one part from another.

Historically, keys have been either glued, welded or pressed in the associated keyway. However, in some cases, it has been applicant's experience that such method of securement is not adequate, depending on service life and conditions.

Accordingly, it would be generally desirable to provide an improved keyway, and an improved method of holding a key in a keyway, that will effectively and reliably hold the key in the keyway over various service conditions.

DISCLOSURE OF THE INVENTION

With parenthetical reference to the corresponding parts, portions or surfaces of the disclosed embodiment, merely for purposes of illustration and not by way of limitation, the present invention broadly provides an improved keyway (31), and an improved method of holding a key (20) in a keyway (31) provided in a member (30).

The improved keyway (31) is formed in a member, and broadly comprises: an elongated slot (32) formed in the member, the slot being configured and arranged to receive a key (20); and the member having at least one sharp corner (34) adjacent either end of the slot and facing into the slot such that a key may be placed into the slot and portions of the member at the sharp corners may be plastically deformed (42) to hold the key in the slot.

In the preferred embodiment, the slot has at least two sharp corners adjacent either end. The slot may have a dumbbell-shaped or dogbone-shaped appearance, when viewed in plan. Each sharp corner may be defined between two converging surfaces. These surfaces may be planar or curved. The included angle between the converging surfaces may be about 90°, or otherwise. The deformed portion of each member may be concave.

In another aspect, the invention provides an improved method of holding a key (20) in a keyway (31) provided in a member (30), which method comprises the steps of: forming an elongated keyway (31) in the member, the member having at least one sharp corner (34) facing into the keyway adjacent either end thereof; forming a key (20) to fit in the keyway, the key being so dimensioned, proportioned and configured that the part of the key immediately adjacent each sharp corner will be recessed with respect to the surface of the member at the corner; placing the key in the keyway; and plastically deforming portions (42) of the member at the sharp corners in the keyway so as to hold the key in the keyway.

As indicated above, the keyway may have at least two sharp corners adjacent either end. The keyway may be dumbbell-shaped or dogbone-shaped, or may have some other shape, when viewed in plan. Proximate portions of the member at each sharp corner may be deformed to hold the key in, the keyway. Each sharp corner may be recessed about 0.015 inches with respect to the surface of the member at that corner. Preferably, the key will be permanently held in the keyway such that the key cannot be removed from the keyway without damaging the member.

As indicated above, each sharp corner may be defined between two converging surfaces. These surfaces may be planar or otherwise. They may intersect at an acute included angle of 90° or some other angle, as desired.

Accordingly, the general object of the invention is to provide an improved keyway that is adapted to be formed in a member, and that is adapted to receive a key therein.

Another object is provide an improved method of holding a key in a keyway provided in a member.

These and other objects and advantages will become apparent from the foregoing and ongoing written specification, the drawings, and the appended claims.

DESCRIPTION OF THE PREFERRED EMBODIMENTS

Figure 1:
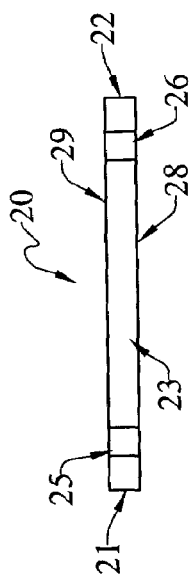
FIG. 1 is a top plan view of a key for use in the improved keyway.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, the present invention provides an improved keyway that is adapted to be provided in a member, and further provides an improved method of holding a key in a keyway provided in such a member.

Figure 2:
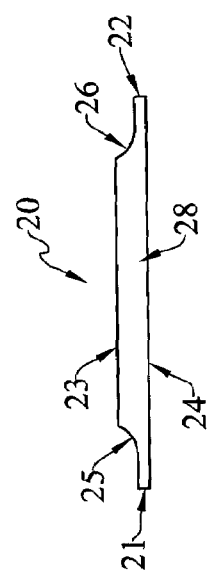
FIG. 2 is a side elevation of the key shown in FIG. 1.

Referring now to FIGS. 1 and 2, a key, generally indicated at 20, is shown as being a horizontally-elongated generally-rectangular member having a planar vertical left end face 21, a planar vertical right end face 22, an upper surface 23, a lower surface 24, and arcuate portions 25, 26 extending between the left and right ends, respectively, and the upper surface. The key is also shown as having a front face 28 and a rear face 29.

Figure 3:
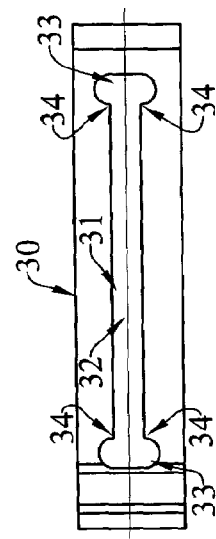
FIG. 3 is a fragmentary top plan view of a first keyway formed in a member, this view showing the keyway as having a dogbone-shaped appearance when seen in plan.
Figure 4:
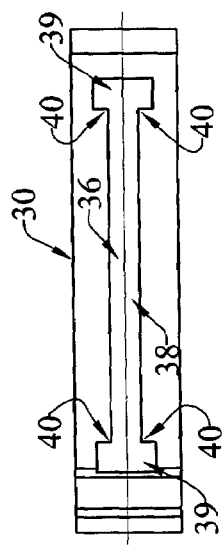
FIG. 4 is a fragmentary top plan view of a second keyway formed in a member, this view showing the keyway as having a dumbbell-shaped appearance when seen in plan.

FIGS. 3 and 4 illustrate two improved keyways that may be formed in a member, generally indicated at 30. In FIG. 3, the keyway, generally indicated at 31, is seen as being somewhat dogbone-shaped, when seen in plan. This keyway has a horizontally-elongated rectangular slot 32 provided with enlarged or bulbous recesses 33, 33 at either end. The intersection of the walls defining recesses 33 with the walls defining slot 32 defines sharpen corners, severally indicated at 34, of the member that face into the slot.

In the alternative embodiment shown in FIG. 4, the keyway, now indicated at 36, is seen as being shaped like a dumbbell, when viewed in plan, and has a horizontally-elongated rectangular slot 38 provided with rectangular openings 39 at either end. Here again, the intersection of the walls defining openings 39 with slot 38 define sharp corners, severally indicated at 40.

Figure 6:
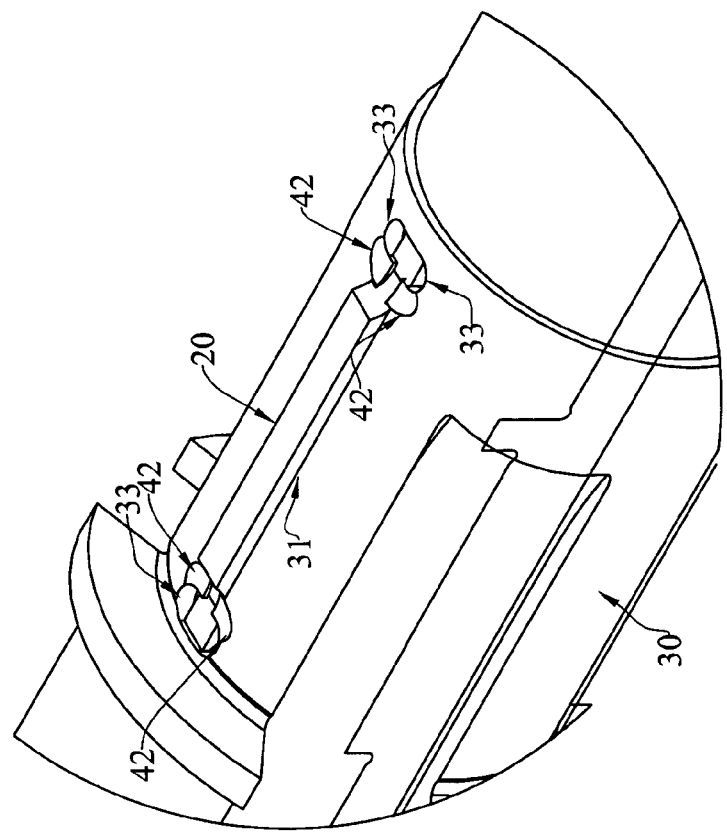
FIG. 6 is a view similar to FIG. 5, but showing the proximate portions of the member at the sharp corners having been deformed so as to permanently hold the key in the keyway.
Figure 5:
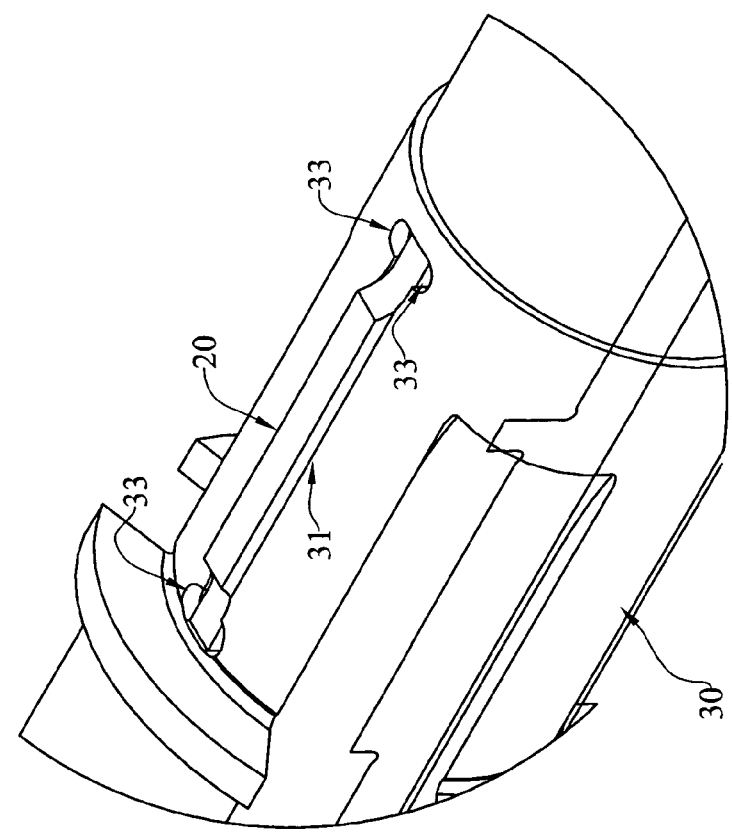
FIG. 5 is a greatly enlarged perspective view showing the key depicted in FIGS. 1 and 2 as being received in the keyway depicted in FIG. 3, prior to the portions of the members being deformed.

FIGS. 5 and 6 illustrate how the keyway is held in the slot. After the keyway is formed, key 20 is simply placed in the slot as indicated in FIG. 5. In this regarding, it should be noted that the part of the key adjacent each sharp corner is recessed by about 0.015 inches with respect to the surface of the member at the corner. Moreover, while the member is shown as having an arcuate outer surface 41, this could be planar, polygonal, or have some other form.

In any event, after the key has been placed in the keyway, the portions of the member at the sharp corners are plastically deformed so as to extend into the keyway, thereby locking the key in the keyway. These deformations, indicated at 42 in FIG. 6, may be formed by a nail set, or flat end punch, or the like. Alternatively, they may be provided by some other form of apparatus.

Therefore, the invention provides an improved keyway that is formed in a member. The keyway broadly includes an elongated slot formed in the member. The slot is configured and arranged to receive a key. The member has a least one sharp corner adjacent other end of the slot and facing into the slot such that a key may be placed into the slot, and portions of the member at the sharp corners may be plastically deformed to hold the key and the slot.

In another aspect, the invention broadly provides an improved member of holding a key in a keyway provided in a member. This method broadly includes the steps of: forming an elongated keyway in the member, the member having at least one sharp corner facing into the keyway adjacent either end thereof; forming a key to fit in the keyway, the key being so dimensioned, proportioned and configured that the part of the key immediately adjacent each sharp corner will be recessed with respect to the surface of the member at the corner; placing the key in the keyway; and plastically deforming portions of the member at the sharp corners into the keyway so as to hold the key in the keyway.

Modifications

The present invention expressly contemplates that many changes and modifications may be made. For example, the shape and configuration of the keyway may be changed, as desired. While two forms of keyway (i.e., dogbone-shaped and dumbbell-shaped) have been shown and described, persons skilled in this art will readily appreciate the keyway may have other shapes and configurations as well. Similarly, the key is not limited to the specific form or shape indicated in the drawings. The portions of the member of the sharp corners may be deformed either manually or automatically, as desired. The materials of the construction are not deemed critical, and may be readily changed as desired.

Therefore, while the preferred forms of the improved keyway and member have been shown and described, and several modifications thereof discussed, persons skilled in this art will readily appreciate that various additional changes and modifications may be made without departing from the spirit of the invention, as defined and differentiated by the following claims.

What is claimed is:

1. A method of holding a key in a keyway provided in a member, comprising the steps of:

forming an elongated keyway in said member, said member having at least one sharp corner facing into said keyway adjacent either end thereof;

forming a key to fit in said keyway, said key being so dimensioned, proportioned and configured that the part of said key immediately adjacent each sharp corner will be recessed with respect to the surface of said member at said corner;

placing said key in said keyway; and plastically deforming portions of said member at said sharp corners into said keyway so as to hold said key in said keyway.

2. The method as set forth in claim 1 wherein said keyway has at least two sharp corners adjacent either end.

3. The method as set forth in claim 2 wherein said keyway has a dumbbell-shaped appearance, when viewed in plan.

4. The method as set forth in claim 2 wherein said keyway has a dogbone-shaped appearance, when viewed in plan.

5. The method as set forth in claim 2 wherein proximate portions of said member at each sharp corner is deformed to hold said key in said keyway.

6. The method as set forth in claim 1 wherein the part of said key adjacent each sharp corner is recessed by about 0.015 inches with respect to the surface of said member at said corner.

7. The method as set forth in claim 1 wherein said key is permanently held in said keyway to said member such that said key cannot be removed from said keyway without damaging said member.

8. The method as set forth in claim 1 wherein each sharp corner is defined between two converging surfaces.

9. The method as set forth in claim 8 wherein each of said converging surfaces is substantially planar.

10. The method as set forth in claim 8 wherein the angle between said converging surfaces at each corner is about 90°.

11. The method as set forth in claim 1 wherein said member surface about said keyway is arcuate.

12. The method as set forth in claim 1 wherein each deformed portion of said member is concave.

* * * * *